(12) United States Patent
Sodan et al.

(10) Patent No.: US 8,604,363 B2
(45) Date of Patent: Dec. 10, 2013

(54) CONNECTING ELEMENT

(75) Inventors: Lars Sodan, Reutlingen (DE); Michael Munz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 540 days.

(21) Appl. No.: 12/734,271

(22) PCT Filed: Sep. 24, 2008

(86) PCT No.: PCT/EP2008/062725
§ 371 (c)(1),
(2), (4) Date: Aug. 20, 2010

(87) PCT Pub. No.: WO2009/062777
PCT Pub. Date: May 22, 2009

(65) Prior Publication Data
US 2010/0300769 A1    Dec. 2, 2010

(30) Foreign Application Priority Data
Nov. 13, 2007    (DE) .......................... 10 2007 054 096

(51) Int. Cl.
*G01G 19/44*    (2006.01)
(52) U.S. Cl.
USPC .......................................... 177/136

(58) Field of Classification Search
USPC ..................................................... 73/862.391
See application file for complete search history.

(56) References Cited

U.S. PATENT DOCUMENTS

| 6,089,106 | A  | * | 7/2000  | Patel et al. ............... 73/862.582 |
| 6,218,632 | B1 | * | 4/2001  | McCarthy et al. ............ 177/144 |
| 7,971,495 | B2 | * | 7/2011  | Loenner et al. .......... 73/862.474 |
| 2003/0156920 | A1 | * | 8/2003 | Dukart et al. ................. 411/383 |
| 2004/0079175 | A1 | * | 4/2004 | Dukart ..................... 73/862.391 |
| 2006/0103192 | A1 | * | 5/2006 | Norton ....................... 297/217.2 |
| 2006/0220367 | A1 |   | 10/2006 | Demuth et al. |

FOREIGN PATENT DOCUMENTS

| DE | 103 54 585 | 6/2005 |
| WO | WO 2005/026677 | 3/2005 |

* cited by examiner

*Primary Examiner* — Hezron E Williams
*Assistant Examiner* — Mohammed Keramet-Amircolai
(74) *Attorney, Agent, or Firm* — Kenyon & Kenyon LLP

(57) ABSTRACT

A connecting element having a measuring device for a force measurement for a vehicle seat is provided. The connecting element has signal output means in a first housing part, and a measuring device in a second housing part. The measuring device itself has a holder including circuit traces for a sensor system. The sensor system and the at least two electrical components are integrally mounted on the circuit traces. The signal output means are electrically connected to the circuit traces in a force-decoupled manner.

14 Claims, 5 Drawing Sheets

CONNECTING ELEMENT

BACKGROUND INFORMATION

German Patent No. DE 103 54 585 describes a connecting element which is used for a force measurement for a vehicle seat in order to determine a passenger weight and its distribution. This aids in the control of passenger protection means such as airbags. A force introduced into the connecting element leads to a displacement of a magnet relative to a Hall sensor, for instance. This makes the force measurable. The connecting element has two housing parts, a first housing part including a plug for the output of signals from the connecting element, and a second part including the measuring device and having the mechanical function of a connecting element. The measuring element is decoupled from a force acting on the signal output means by a cable disconnector, for instance. A spring contact could be used for this purpose.

SUMMARY OF THE INVENTION

The connecting element according to the present invention has the advantage that it is possible to dispense with a circuit board or with inserts, so that the design is simplified even further. For, according to the present invention, the electrical components and the sensor system are integrally mounted on the circuit traces of the holder provided in the measuring device. In addition, the signal output means are electrically connected to the circuit traces in a force-decoupled manner. As a result, the space, material use, and the production expense for the plug housing are able to be reduced considerably. According to the present invention, components such as the mounting plate, or press-fit zones and also steps in the production process are omitted. Omitted steps are, for example, the press-fitting of the mounting plate in the plug housing and the packaging and fitting of the contact spring. Furthermore, the production process of the plug housing may be simplified in that the plug pins are fixed in place in a less complicated manner, and essentially no more than two inserts are involved.

In the present case, the connecting element is a bolt, for example, or a screw which is able to be introduced into the seat frame of a vehicle. In this way the installation of this connecting element does not lead to an increased seat height.

The measuring device is configured for a force measurement and records the force introduced into the connection element, which, for example, leads to a displacement between a sensor, e.g., a Hall sensor, and a magnet. Other configurations, however, in which the force introduction is measurable via sensors, for example, which are able to record an expansion or similar processes, are conceivable as well. Thus, the measuring device is able to record motions or mechanical stresses, for one. In the case at hand, the force measurement is relevant in particular for measuring the weight of the vehicle passenger, since such a weight measurement affects the control of passenger protection means such as airbags with regard to the degree of force by which an airbag is triggered or whether an airbag is able to be triggered in the first place.

Signal output means are, for example, plug pins or other mechanical connections that allow the output of signals. Finally, the signal output may also be implemented without a line, i.e., a mechanical connection.

The connecting element according to the present invention has two housing parts, which are joined to one another, the first housing part, the signal output means, thus being used as a plug, while the second housing part includes the measuring device used for measuring the introduced force.

In this instance, the holder is a lead frame having circuit traces, which are separated from each other by plastic or air, for example. As a result, a plurality of components and also a sensor system are able to be accommodated on this holder.

The sensor system preferably is a Hall sensor system, but strain gauges or other sensors, which are able to record mechanical stressing, for instance, may be used as well. Other sensors also may be used for recording a movement of one part of the connecting element relative to another part, such as optical sensors, for example.

The integral mounting of the components and the sensor system on the circuit traces enables both an electrical and a mechanical connection.

The signal output means are electrically connected to the circuit traces in a force-decoupled manner in order to decouple forces from this electrical connection that are acting on the signal output means and could influence the signal transmission from the circuit traces to the signal output means. This is prevented according to the present invention, so that the electrical transmission of the signals is improved.

It is advantageous that the electrical components are two capacitors which are connected in parallel with the connections of the sensor system. For instance, these capacitors may be used to shield the sensor system from high pulses in that these pulses are short-circuited by the capacitors. Capacitors of this type may be important for other electromagnetic interference as well.

In addition, it is advantageous that the integral connection of the sensor system and the at least two electrical components on the circuit traces is implemented by conductive bonding, soldering, or welding. Conductive bonding is especially advantageous in this context because the curing step of the conductive bonding agent is able to take place simultaneously with the curing step of the bonding agent used for affixing the sensor system. The use of such an adhesive bonding agent ensures both the mechanical affixation and the electrical connection.

In addition, it is advantageous that the signal output means has at least two plug pins which are integrally connected to the particular contact springs, via which contact springs press on the conductive circuit traces for the electrical connection. In this case the integral connection can be realized by welding, in particular. The plug pins are used for the connection with electrical cables, for example. Press-fitting the contact springs on the circuit traces allows the connection to be produced in an especially simple manner.

Moreover, it is advantageous that the at least two plug pins are shot into the first housing part. The shooting of such plug pins is an especially cost-effective production variant.

The holder advantageously has a first section on which the sensor system and the at least two electrical components are fixed in place. However, the holder also has a second section on which the contact springs are pressing, the holder itself being formed as one piece and the first and the second section being realized by angle bends. This enables an especially uncomplicated production of the connection element according to the present invention. In addition, a mechanical barrier between the two bonding surfaces ensures that mutual contamination is impossible. The components (two capacitors) are mounted by conductive bonding using a different adhesive than the Hall IC, which is mechanically fixed in place by a silicon bonding agent, prior to being brought into electrical contact with the lead frames by selective soldering. This mechanical barrier ("plastic collar") is integrally extruded during the same production step in which the lead frames are extrusion-coated with plastic.

DETAILED DESCRIPTION

Figure 1:
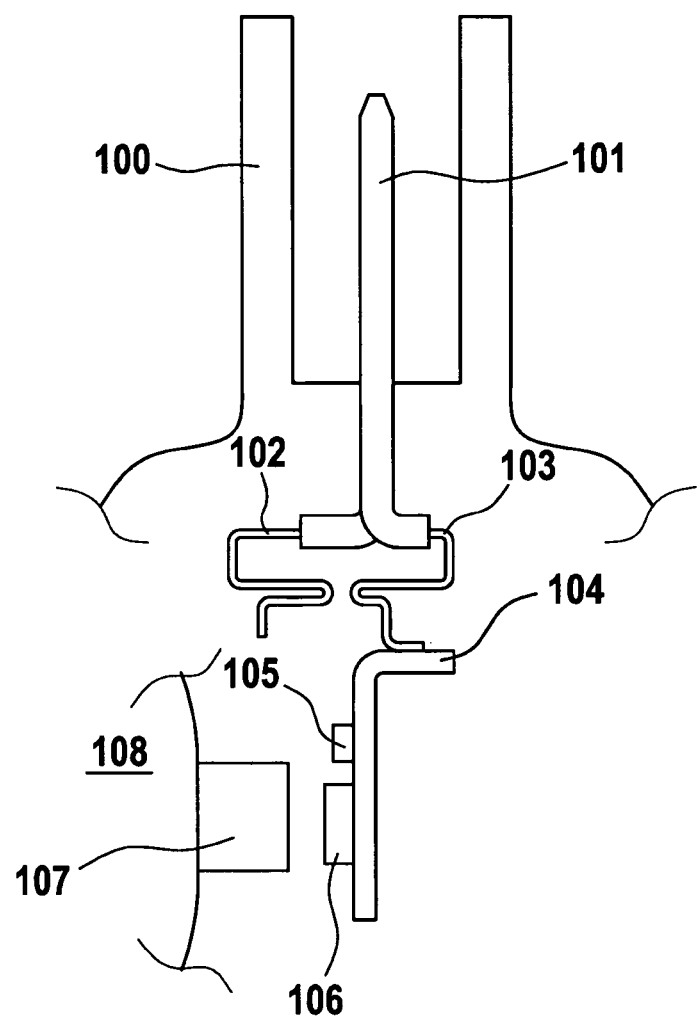
FIG. 1 shows, in simplified form, the relevant portion of the structure of the connection element according to the present invention.
Figure 2:
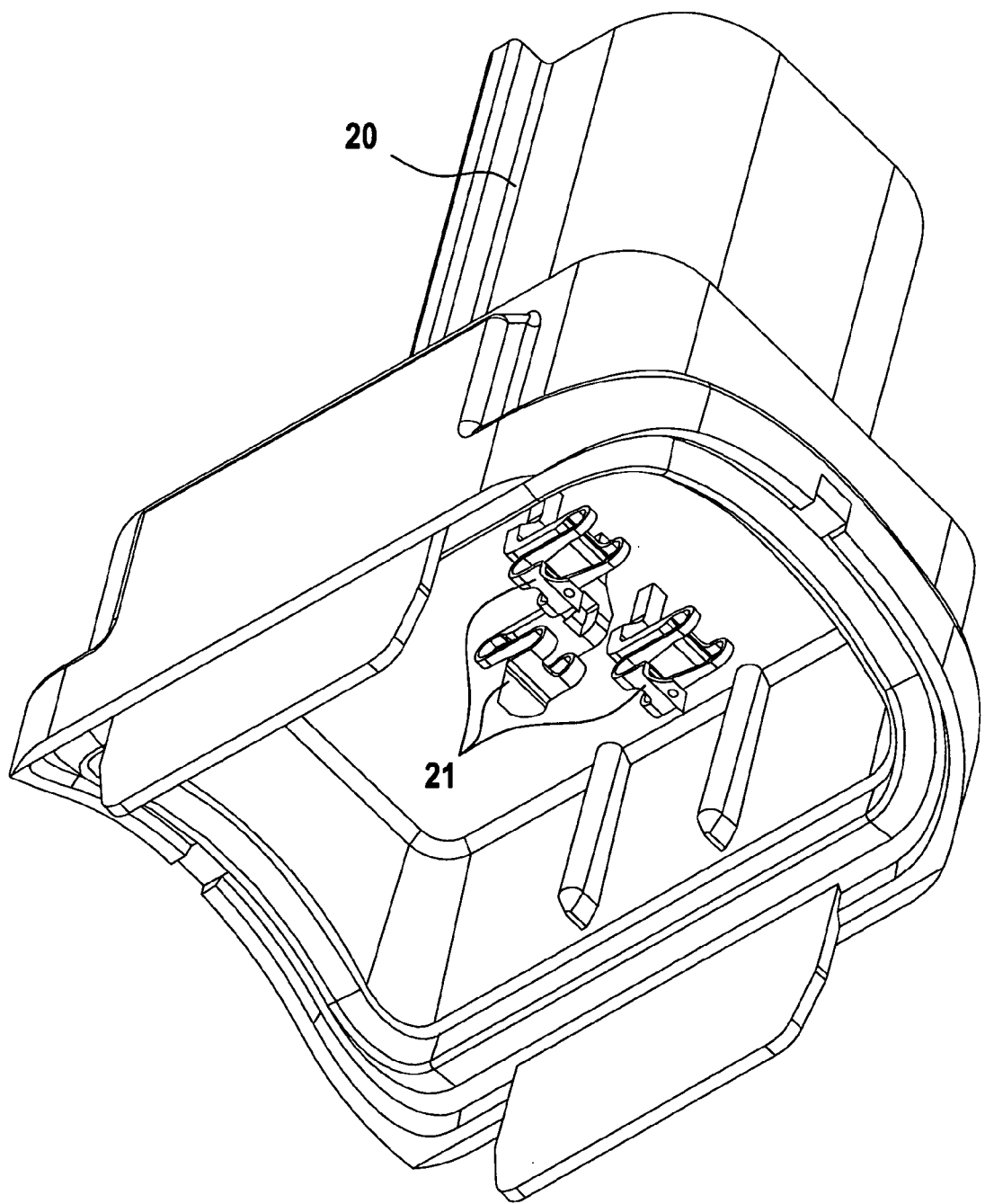
FIG. 2 shows a perspective view of the first housing part.
Figure 3:
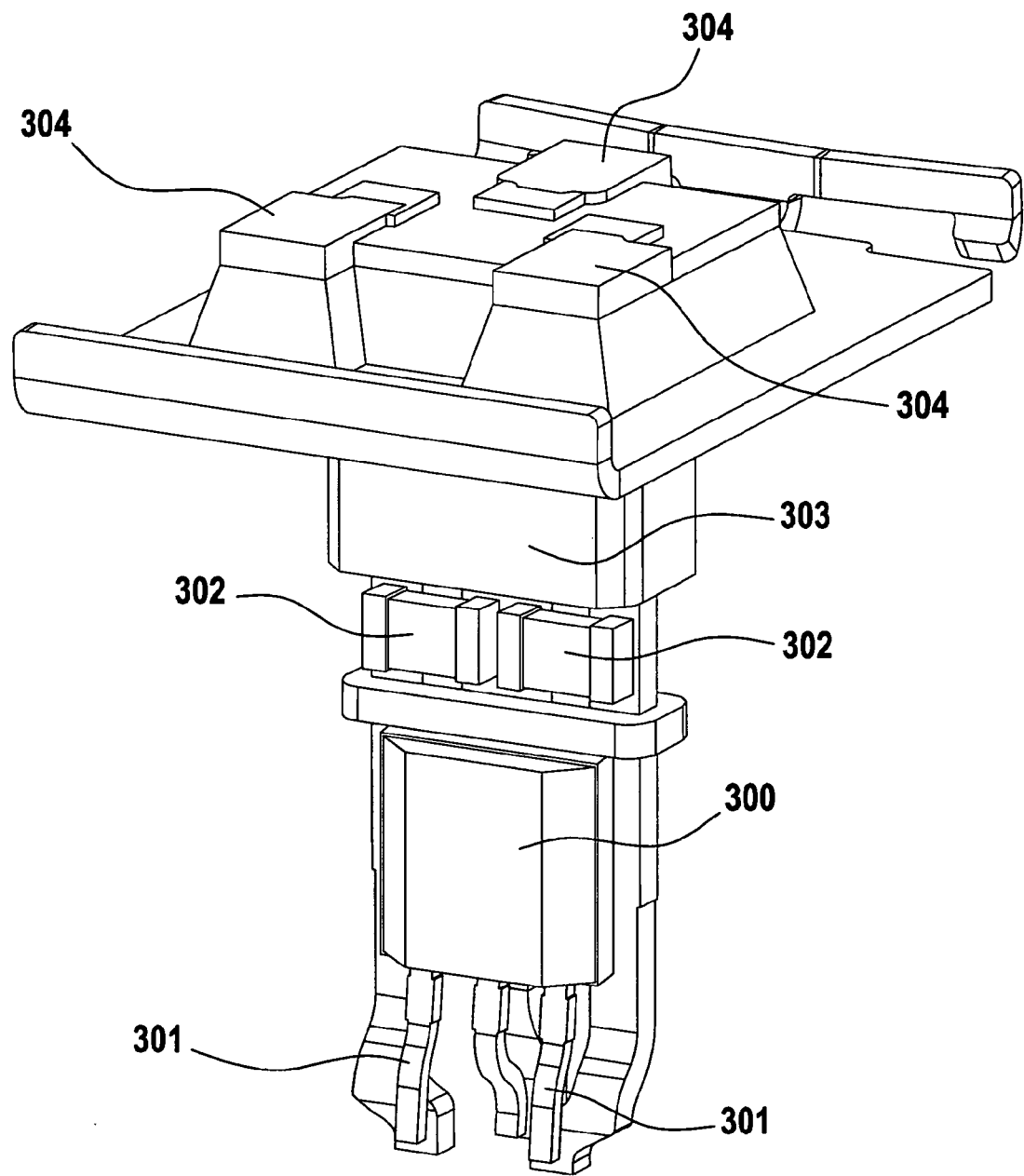
FIG. 3 shows a perspective view of the holder.

FIG. 1 schematically shows the signal output means connected to holder 104. First housing part 100 has signal output means, which are made up of at least one plug pin 101 and contact springs 103 and 102; here, only contact spring 103 is shown connected to holder 104. Contact spring 103 exerts pressure on circuit traces situated on holder 104. This produces the electrical connection in a manner that is decoupled from forces acting on first housing part 100. Integrally mounted on holder 104 are electrical components 105 and sensor system 106, which is a Hall sensor in this instance. Hall sensor 106 is situated across from a magnet 107, which is fixed in place on a bending beam 108 and moves relative to the Hall sensor in response to the introduction of force into the connection element, so that the force measurement is able to be obtained via this movement.

For simplicity's sake, the manner in which holder 104 is installed in the second housing part is not illustrated, but can be gathered from the related art, for instance. Moreover, to simplify matters, additional details of the first and the second housing parts have been omitted.

Contact spring 103 is welded to plug pin 101. Electrical components 105 and sensor system 106 are mounted on the circuit traces of holder 104 by conductive adhesive in this case.

The 90 degree angling is clearly visible here. One of the contacts is realized by the circuit traces of the holder, i.e., the lead frame. The lead frames are three individual parts, which are separated from the 3-piece package just prior to the insertion into the injection molding die.

Figure 4:
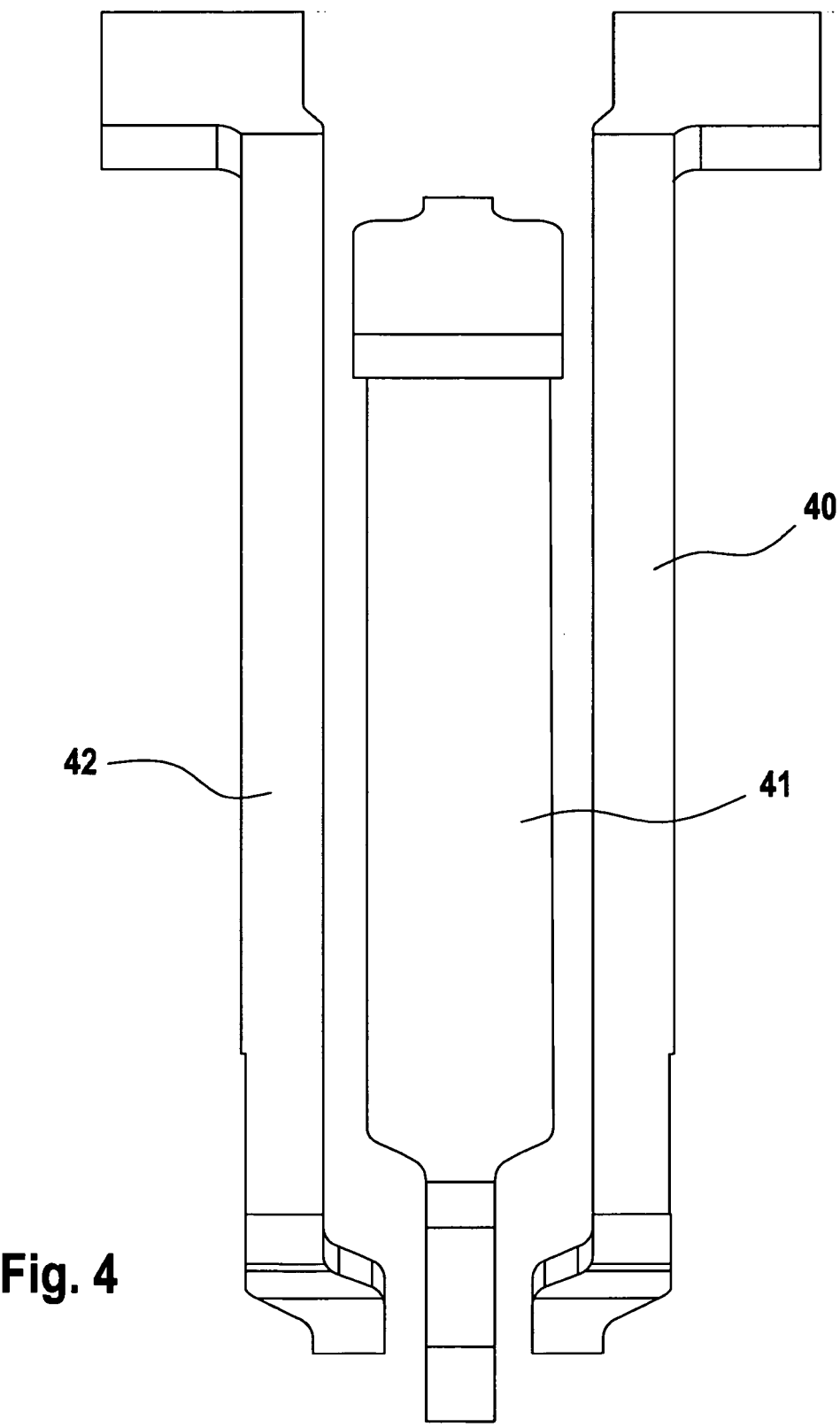
FIG. 4 shows the holder with its three inserts.

FIG. 4 shows the three parts of the lead frame in the uninstalled state. The three parts are a center part 41, and individual symmetrical outer parts 42 and 40, all three parts having a receiving surface for the components as well as the contacts for the connection to the plug part.

Figure 5:
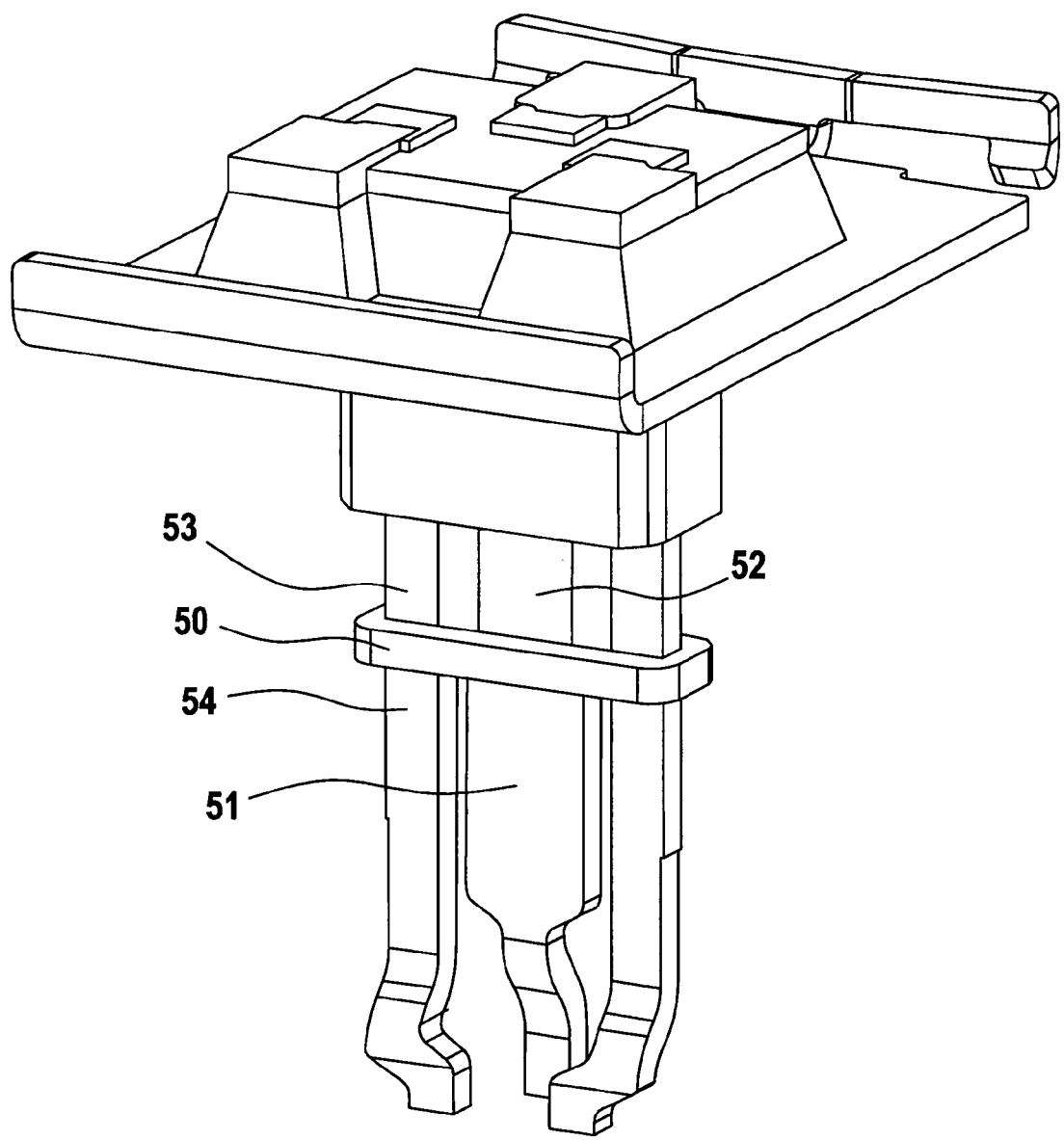
FIG. 5 shows the installed holder without components.

FIG. 5 is another illustration of the installed lead frame, a barrier 50 preventing a contamination between adhesive surfaces 51 and 52 as well as 53 and 54. The contamination is a possibility because different adhesive agents are used for mounting the capacitors on the one hand and the Hall IC on the other. The adhesive agents may be implemented as conductive adhesive agents, especially for the capacitors, while selective soldering may be useful to produce the electrical connection for the Hall IC.

What is claimed is:

1. A connecting element having a measuring device for a force measurement for a vehicle seat, comprising:
    a first housing part and a second housing part separate from the first housing part;
    a signal output device in the first housing part;
    a measuring device in the second housing part, the measuring device including a holder having circuit traces that form electrical connections to a sensor system of the measuring device,
    wherein the sensor system and at least two electrical components are integrally mounted on the circuit traces, and
    wherein the signal output device outputs a signal from the measuring device, is electrically connected to the measuring device via the circuit traces, and is connected to the holder via a contact arrangement that prevents mechanical forces acting on the signal output device from influencing measurements performed by the measuring device.

2. The connecting element according to claim 1, wherein the electrical components include two capacitors connected parallel to connections of the sensor system.

3. The connecting element according to claim 1, wherein the sensor system and the at least two electrical components are mounted on the circuit traces by adhesive bonding, soldering or welding.

4. The connecting element according to claim 1, wherein the signal output device includes at least two plug pins integrally connected to individual contact springs, the contact springs form the contact arrangement, and one of the contact springs exerts pressure on the circuit traces to form an electrical connection between the signal output device and the circuit traces.

5. The connecting element according to claim 4, wherein the at least two plug pins are shot into the first housing part.

6. The connecting element according to claim 4, wherein the holder has a first section, on which the sensor system and the at least two components are mounted, and a second section on which the contact springs exert pressure, the holder being implemented in one piece, the first and second sections being implemented by bending.

7. The connecting element according to claim 4, wherein each of the contact springs includes a plurality of ninety degree bends.

8. The connecting element according to claim 4, wherein each contact spring is welded to a respective one of the plug pins.

9. The connecting element according to claim 3, wherein the sensor system is mounted with a different material than that used to mount the at least two electrical components.

10. The connecting element according to claim 9, wherein the sensor system is mounted with solder and the at least two electrical components are mounted with adhesive.

11. The connecting element according to claim 9, further comprising:
    a mechanical barrier between a first portion of the circuit traces to which the at least two electrical components are mounted and a second portion of the circuit traces to which the sensor system is mounted.

12. The connecting element according to claim 11, wherein the barrier is plastic.

13. The connecting element according to claim 1, wherein the sensor system is a Hall sensor.

14. The connecting element according to claim 1, wherein the holder is a lead frame.

* * * * *

UNITED STATES PATENT AND TRADEMARK OFFICE
CERTIFICATE OF CORRECTION

PATENT NO.       : 8,604,363 B2                                    Page 1 of 1
APPLICATION NO. : 12/734271
DATED            : December 10, 2013
INVENTOR(S)      : Sodan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this
Twenty-second Day of September, 2015

Michelle K. Lee
*Director of the United States Patent and Trademark Office*